United States Patent [19]
Bradt

[11] 4,078,957
[45] Mar. 14, 1978

[54] FILAMENT WINDING APPARATUS AND METHOD

[76] Inventor: Rexford H. Bradt, 725 E. Ft. Wayne St., Warsaw, Ind. 46580

[21] Appl. No.: 746,677

[22] Filed: Dec. 2, 1976

Related U.S. Application Data

[60] Division of Ser. No. 403,052, Oct. 3, 1973, Pat. No. 4,010,054, which is a continuation-in-part of Ser. No. 139,441, May 3, 1971, abandoned.

[51] Int. Cl.² .................... B65H 81/00; B65H 81/08
[52] U.S. Cl. ................................... 156/173; 156/187; 156/195; 156/244.13; 156/289; 156/429; 156/498; 242/7.22
[58] Field of Search ............... 156/173, 172, 175, 195, 156/190, 187, 425, 188, 429, 430, 431, 432, 244, 167, 289, 498, 500; 242/72 R, 7.21–7.23; 279/2 R; 425/90, 102

[56] References Cited

U.S. PATENT DOCUMENTS

| | | | |
|---|---|---|---|
| Re. 27,500 | 10/1972 | Thomas | 93/80 |
| 2,563,994 | 8/1951 | Dougherty | 242/72 R |
| 2,656,873 | 10/1953 | Stephens | 156/167 |
| 2,815,043 | 12/1957 | Kleiner et al. | 156/195 |
| 3,301,734 | 1/1967 | Britton et al. | 156/425 |
| 3,332,815 | 7/1967 | Havens | 156/175 |
| 3,507,412 | 4/1970 | Carter | 214/338 |
| 3,616,063 | 10/1971 | Bradley | 156/425 |
| 3,616,070 | 10/1971 | Lemelson | 156/173 |
| 3,698,986 | 10/1972 | Okmura | 156/429 |
| 3,700,519 | 10/1972 | Carter | 156/173 |
| 3,706,624 | 12/1972 | Rinker | 156/195 |
| 3,932,254 | 1/1976 | Comte | 156/429 |

*Primary Examiner*—William A. Powell
*Assistant Examiner*—Michael W. Ball
*Attorney, Agent, or Firm*—Albert L. Jeffers

[57] ABSTRACT

A precision thermoplastic winding method and apparatus for forming heterogeneous pipe by winding a first hot thermoplastic strand on a mandrel, then applying a second strand of uncured thermosetting material on the first layer to form a second layer on the mandrel, and thereafter helically winding a hot thermoplastic strand on the second layer to form a third layer on the mandrel and to thus seal and cure the second layer of thermosetting material.

12 Claims, 17 Drawing Figures

FILAMENT WINDING APPARATUS AND METHOD

RELATED APPLICATION

This application is a division of Ser. No. 403,052, now U.S. Pat. No. 4,010,054. filed: Oct. 3, 1973, which application was a continuation-in-part of Ser. No. 139,441 filed: May 3, 1971, now abandoned.

OBJECTS OF THE INVENTION

It is the object of this invention to provide a practical process for making, handling and winding strands of thermoplastic materials or thermoplastic materials in combination with other plastic materials or reinforcements to form useful shapes.

Another object is to provide a continuous process and apparatus which will make wound shapes from thermoplastic windable materials.

Yet another object is to make stronger pipe and the like from highly stretch oriented peripherally wound thermoplastic materislsals.

BACKGROUND OF THE INVENTION

The winding of assorted plastics and rubbers to make cylindrical articles has long been practiced. Soda straws have been spiral wound, phenolic saturated canvas is wound on mandrels and cured to make bearings, rubber has been saturated into cloth and wound spirally to make industrial hose and in recent years fiberglass saturated with polyesters have been wound into industrial pipe and other shapes.

Polyester fabrications have contributed most of the prior filament winding technology. Polyesters are syrups at room temperature and must be catalized and heated for rapid cure. Syrups are either saturated into fiberglass strands before, during or after winding of same. In all cases the glass is wound against glass because the syrup is too thin to effectively separate a tension wound strand of fibrous glass. Rotation of mandrel or form must be slow when using liquid polyester saturates to avoid centrifugal losses. The alternate method of post-saturation results in pinholes and porosity unless overwrapped with cellophane or equivalent and centrifugally spun to more effectively displace air.

Rotating conveying mandrels using belts, chain or other devices to continuously propel a builtup winding on the mandrel are known. Such require protective continuous overwrapping to prevent fouling of equipment with polyester syrup which effectively destroys the usefulness of the equipment. Such means of conveying and overwrapping layers also prevents efficient heat transfer from mandrel to wound part and thereby prevents such processes from being commercially competitive.

Polyester winding methods also include use of creels rotating about the mandrel. Balancing same at high speeds is impractical because reinforcement packages are not commercially uniform enough to be rotated on a creel at several hundred revolutions per minute.

All objects which can be made by winding have specific strength needs which require great winding pattern flexibility and reliability of pattern once established. Many continuous processes only provide for winding spirals. Pressure pipe and stressed products require that crossed spirals be used and same must usually be balanced.

To present date, to the applicant's knowledge, no thermoset plastic material capable of forming an unreinforced self-supporting strand is known to the trade.

Thermoplastics can form self-supporting strands, yet because of their inherent hot tack and other properties which make guiding and handling of strands difficult, have not been effectively used in filament winding. Because of the kinetic mode of operation needed in working with thermoplastics, an entirely different technique and art is required as compared with reinforced thermoset technology.

In prior commercial art, only one method has been found and it used not guiding or tension control when a rotating tank from mounting on a rail car was slowly moved past the ribbon die of an extruder to slowly produce a heavy overlapped spiral winding.

The technology of thermoplastic filament winding has substantially no background.

DEFINITIONS OF TERMS AS USED IN THIS INVENTION

The term thermoplastic as used herein comprehends thermoplastic resins (e.g., polystyrene, polyvinyl chloride) as well as other materials which soften even temporarily upon heating (e.g., "B" stage phenolic, epoxy and melamine resins as well as a variety of rubbers and organic or inorganic glasses).

The term strand is used in this application to means a continuous guidable form of material usually supplied by extrusion and delivered to the guiding means in a molten condition which may be applied at one guiding and application station. Thus a strand may include a single filament or a warp of very many separate and parallel filaments. A filament may consist of a monofilament of a plurality of monofilaments, a plastic encased wire or a saturated reinforcement, a filled or hollow tube, a ribbon, an extruded profile, a length of foam, or any substantially continuous guidable form suited to wrapping on a mandrel regardless of how formed.

As herein used, guidable refers to its common meaning imparting requisite flexibility plus the ability of responding to surface treatments for rendering soft, tacky thermoplastics non-clinging to guides.

Stretch orientation is a term common to the textile fibers and plastic strapping manufacturing art. It refers to the orienting of composing molecules into a lateral alignment with attendant increase in tensile strength of the formed filament. The drawing and drafting of thermoplastics are coming to mean stretch orienting.

As herein used, case harden referes to a momentary, shallow, surface quenching such as is obtained by high speed passage through hot water or steam or momentary contact with a vaporizable film to impart a temporary non-sticky surface to a filament so that internal heat can later resoften it.

The term composite has recently come to mean a structure composed of fiberglass and plastic. The term heterogeneous is used in this application to cover the assorted combinations of materials other than fiberglass reinforced plastics.

Cohesion is the joining of similar material as contrasted to the adhesion of different materials.

The term turn-around node refers to the location at which the spiral of grouped separated parallel filaments reverses direction or the spiral turns around, a terminus.

Progressive winding as herein used refers to the pattern obtained when moving a strand guiding applicator to-and-fro while moving the applicator support base in a direction parallel to the axis of rotation of the part being formed. Thus increments or right and left turning spirals are formed with a degree of overlapping determined by the specific settings selected. A series of overlapping frustrums of cones comprises the layer formed from low lead movement of the applicator while open structures may be obtained with synchronized high lead patterns.

A slip mandrel is a rotating highly polished form usually tapered toward an unsupported or open end.

A troweling head is an applicator or delivery head for thermoplastic material, usually movable, and supplied with thermoplastic by, or flexibly connected to, a pressure supply such as an extruder, and having a doctor blade of any configuration which shapes, separates, meters, levels and compacts or trowels the applied material into intimate contact with the rotating mandrel or prior applied material on the mandrel. The bare mandrel and/or pre-wrapped mandrel forms at least part of the outlet of the troweling head so that the applied material need not form a discrete self supporting strand.

The strand from a troweling head always escapes in the outwardly rotating direction, while the inward rotation of the mandrel prevents material escape on that side of the troweling head.

SUMMARY OF THE INVENTION

This invention relates in general to the production of pipe, tanks or other wound structures by winding hot, sticky strands of a thermoplastic material on a rotating mandrel.

The mandrel on which the product is wound is tapered and polished to facilitate removal of any chilled tubular shape formed thereon and has internal channels through which cold water or other chilling fluid is pumped to at least partly solidify the newly formed pipe so that it may be pulled or pushed from the mandrel.

In order to provide more time for the innermost layer of thermoplastic in contact with the mandrel to cool, the rotating chilled mandrel is allowed to remain in a stationary relationship with respect to the freshly applied material for at least an instant before moving the wound material axially along the mandrel. During such stationary period the winding operation is continued and overwraps the previously applied material.

Various tensioning and guiding devices are also provided for control of the hot strand between the extruder die and the applicator wand. The surface of these devices may be constantly supplied with water or other volatile liquid so that the strand passing over them does not stick or clog up the device. The strand may alternately be passed through a hot water bath at high speed to case harden it and solidify its skin prior to passing over guiding rollers. However, this case hardening is remelted by the internal heat or the strand soon after it emerges from the bath. Instead, the strand may be dusted with a compatible thermoplastic powder to enable a guide or roller to be used without a sticking problem. This dust or powder also melts soon after its application and thereby does not interfere with the bonding of adjacent windings and layers.

In a representative form of this invention, a thermoplastic strand is supplied in a hot semi-molten form from a conventional extruder. The strand is passed through tensioning devices which stretch it before it is applied by a rapidly reciprocating applicator wand to the rotating mandrel. Compacting or holding rolls are used to hold the new windings in place especially at the point where the wand changes direction. In some instances, the chilled mandrel is slowly traversed back and forth to increase the amount of time the newly formed pipe has to harden before being conveyed off. The pipe conveyors may be either continuous in operation or may intermittently strip the mandrel. Either internal or external rotating and gripping conveyors or tractors may be used. By closely synchronizing the rotation and traversing of the mandrel, the speed, length of stroke, and movement of the applicator wand and the movement of the conveyors, pipe with a specific wall thickness, desired pattern of winding and strength characteristics may be formed.

A cool strand of thermoplastic may also be used for the winding process but must be heated before application. Creation of a cohesive bond between unmelted strands may be accomplished by a shaped and heated shoe over which the strand must pass. The shoe is also in contact with the previous winding upon which the in-running strand is to be wound to assure its susceptibility to being bonded with the new winding. Alternately the rapidly moving strand may pass through a hot gaseous heat source, such as a flame, immediately prior to pressing against the body being wound. This gaseous heat source can also heat the surface of the body on which the in-running strand is being wound to effect superficial but intimate cohesive anchoring of the strand without melting or appreciably annealing a stretch oriented strand being applied. An oven may be used to encase a portion of the mandrel to stabilize and make uniform the temperature of the wound strands where slow exterior cooling is beneficial during progressive winding.

A variety of heterogeneous products may be formed by using a plurality of application stations either axially or circumferentially arranged in close proximity to the mandrel. Such multi-station apparatus may utilize an inner wound layer and an outer wound layer between which is sandwiched a layer of troweled on thermoplastic or thermosetting plastic. Pipe so formed can utilize the heat of the inner and outer thermoplastic windings to cure a middle layer of thermoset. The heterogeneous wall structure thus formed may take advantage of the strong points of several plastics, rather than depending on a plastic which is only good in a single respect. Thus this process may be used to make assorted products. For example, a series of products may be made by either winding a given material to form a single layered product or by winding successive layers of the same material in order to facilitate partial cooling of each layer or by winding a first layer in an annealed more resistant form, successive layers in a stress oriented high tensile form and finally an outer protective layer in less easily abraded annealed form. By these and other variations heterogeneous structures may be made from a single material applied in different forms or patterns.

In addition this process permits use of many combinations of materials and heterogeneous structures of great variety are possible. For example, pipe made from a first chemically resisting impervious inner layer overwrapped by one or more structurally strong layers and finally followed by outer layers as may be made from insulating foams and/or weather or flame proofing materials.

Furthermore, wound combinations may be made of thermoplastic materials containing reinforcements or encasements of any type such as: metal wire, textile or fiberglass threads or rovings, twine or mats, hollow, electrically conductive, or otherwise functional thermoplastic encasable strandforming materials.

One preferred combination of materials is obtained by winding a first layer of hot thermoplastic material, a second layer of reinforced thermsetting material and a third layer of hot thermoplastic material to encase and supply added heat for curing the intermediate thermosetting layer as well as adding chemical, scuff and weathering resistance.

DESCRIPTION OF THE DRAWINGS

The accompanying drawings illustrate the invention. In these drawings:

FIG. 3 is a section showing a hot gas applicator head;

DETAILED DESCRIPTION OF THE PREFERRED EMBODIMENT

Figure 1:
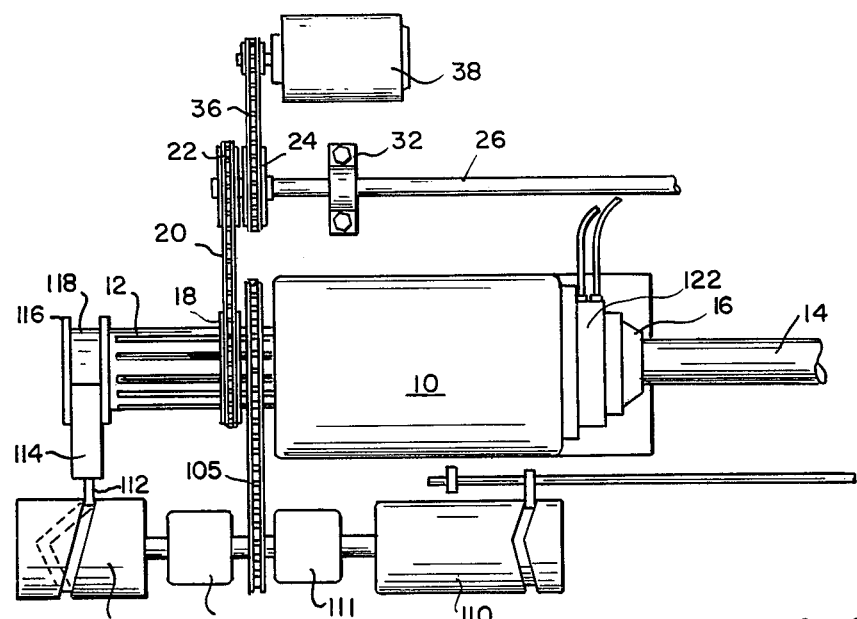
FIG. 1 is a plan view showing a portion of filament winding apparatus.
Figure 2:
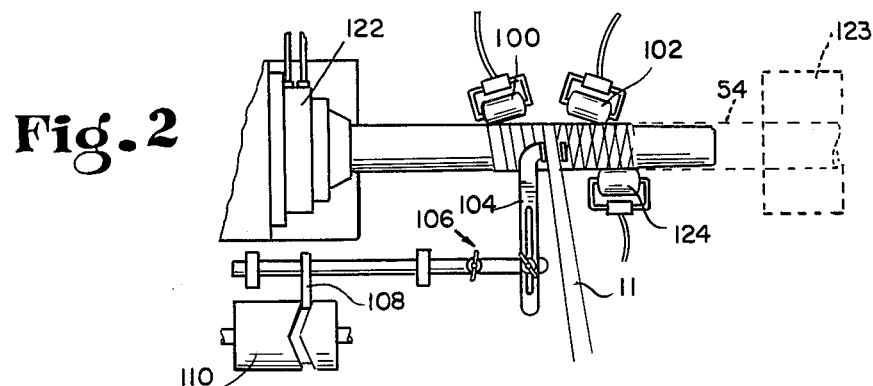
FIG. 2 is a plan view of an adjacent portion of the apparatus shown in FIG. 1.
Figure 3:
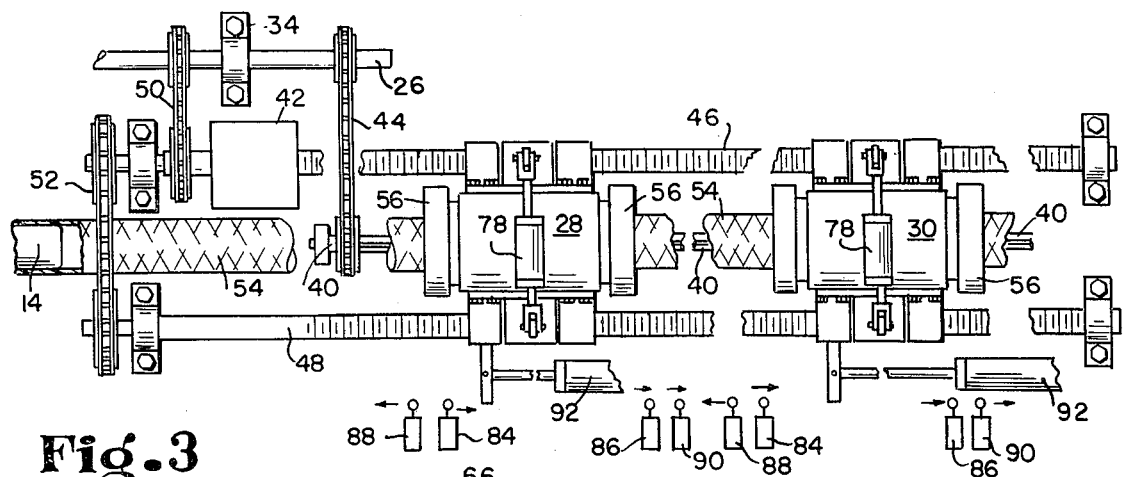
FIG. 3 is a plan view of the remaining portion of the apparatus shown in FIGS. 1 and 2.

FIGS. 1 through 3 illustrate a machine for the winding of plastic pipe or tank shells. The machine comprises a headstock 10 which contains and supports a spindle 12. The spindle 12 is connected at its forward end to a tapered winding slip mandrel 14 by a quick change lock nut 16. The mandrel is highly polished and is tapered toward its forward unsupported end, preferably by one to two degrees, to facilitate the removal of pipe wound thereon and to compensate for shrinkage of the cooling pipe. The highly polished surface of the mandrel also facilitates this removal as well as providing a smooth finish to the inner surface of the product pipe thereby reducing the frictional losses effected in a liquid flowing through the finished pipe.

Figure 5:
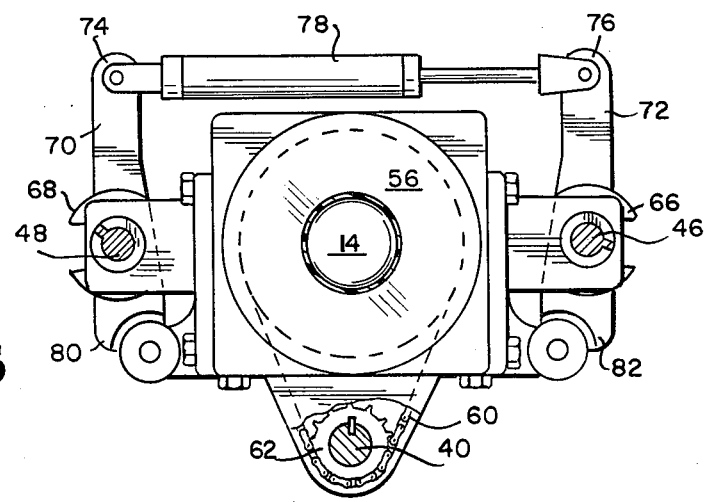
FIG. 5 is a section on the line 5—5 of FIG. 4.
Figure 4:
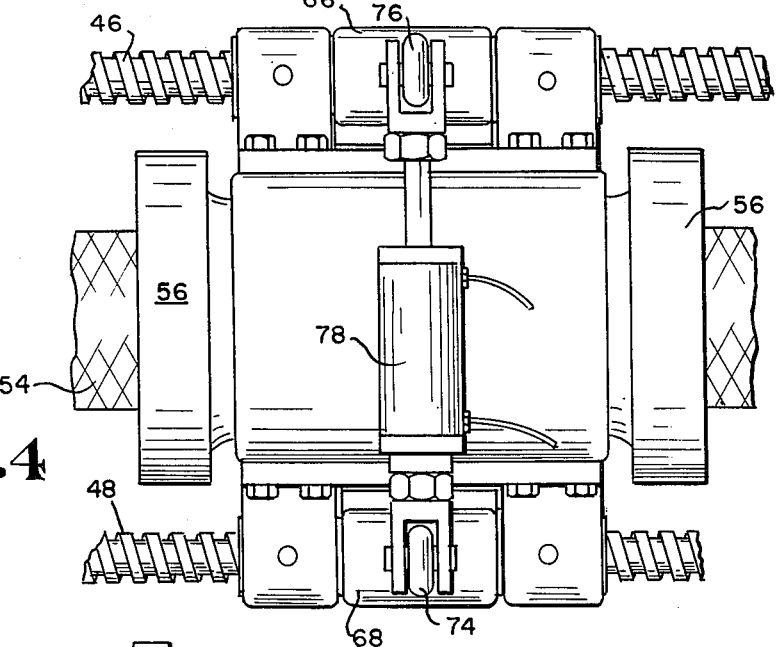
FIG. 4 is an enlarged plan view of one of the pulling tractors shown in FIG. 3.

The spindle 12 and the connected mandrel 14 are rotated by means of a chain driven sprocket gear 18 mounted on the spindle to the rear of the headstock 10. The driving chain 20 is connected to one of a pair of sprocket gears 22 and 24 mounted on the end of a drive shaft 26 which supplies a rotatory drive for the tractors 28 and 30 which are synchronized to continuously rotate with, and to remove finished pipe from the mandrel. The drive shaft 26 is supported in and by bearing blocks 32 and 34. Rotational power is supplied to the main tractor pull off drive shaft 40 through a timing chain 44 from the main drive shaft 26. The tractors 28 and 30, shown in more detail in FIGS. 4 and 5, are supported on the main tractor drive shaft 40 and two matched lead screws 46 and 48 which supply the power for the tractor to pull pipe from the mandrel. Lead screws 46 and 48 are driven through a transmission 42 and timing chains 50 and 52 from the main spindle drive shaft 26.

The tractors 28 and 30 are shown in more detail in FIGS. 4 and 5. The function of these tractors is to continuously remove completed pipe 54 from the mandrel 14. Each of the tractors has an air operated double chuck 56 which is clamped on the newly formed pipe 54 to pull it from the mandrel. The chuck 56 is rotated at the same speed as the mandrel 14 by a chain 60 driven from a sprocket gear 62. This gear 62 is slidably keyed to the main tractor drive shaft 40 so that the shaft 40 rotates the gear yet allows it to move longitudinally within a keyed slot in the shaft. It is important that the air chucks 56 be rotated at exactly the same speed as the mandrel to avoid applying a torque or twist to the new pipe.

The pulling movement of the tractors 28 and 30 is controlled by the engagement of two half-nuts 66 and 68 with the lead screws 46 and 48 respectively. Each of these half-nuts 66 and 68 is controlled by a retractable arm 70 and 72 in which they are carried. The upper ends of these arms 70 and 72 are rotatably connected to the ends of a piston in an air cylinder 78. When the piston in this air cylinder 78 is extended, the arms 74 and 76 rotate about the lower ends 80 and 82 so that the two half-nuts 66 and 68 engage the leads 46 and 48. Conversely, the half-nuts 66 and 68 are disengaged from the lead screws when the piston in the air cylinder 78 is retracted.

The clamping of the air chucks and the engagement of the half-nuts are controlled by means of uni-directional limit switches which are depressed by extending members on the tractors 28 and 30 as the members pass over them. The arrows in FIG. 3 adjacent these switches signify which direction the respective tractor must be traveling to actuate each switch. Each tractor 28 and 30 has two pairs of these controlling limit switches associated with it. The inner two switches 84 and 86 control the clamping and unclamping respectively of the air chuck; the outer two switches 88 and 90 control the engagement and disengagement, respectively, of the half-nuts. The half-nut disengaging switch 90 also controls an air solenoid 92 which rapidly moves the tractor toward the mandrel until it has passed over the air chuck clamping switch 84 and has actuated the half-nut engagement switch 88. The latter switch 88 also de-energizes the return air solenoid 92.

Preferably, one tractor has its air chuck clamped and is pulling the pipe as the other tractor is being returned to its starting position by the particular return air cylinder 92. The air chuck clamping switch 84 is activated only when the tractor is moving in a pulling direction, i.e., form left to right as in FIG. 3, and the air chuck unclamping switch 86 is activated before the return switch 90 so that the air chuck is clamped after and prior to any changes in the direction of the tractor's movement.

The actual winding of the pipe takes placed in a zone defined by holding rollers 100 and 102 located in close proximity to the mandrel 14. The thermoplastic ribbon or filament to be wound into pipe is supplied by a conventional extruder and its tension adjusted by tensioning devices before passing across an applicator wand 104 and being applied to the rotating mandrel 14. The wand 104 is connected to adjustable linkage 106 which has a finger 108 attached thereto which acts as the follower in the track of a cam 110. The configuration of this track controls the reciprocatory movements of the wand 104. It is to be understood that the track in this cam 110 shown in FIG. 2 is only exemplary of an actual cam track configuration. The actual configuration depends upon the lead of the winding desired. A long lead (i.e., a coarse thread) with respect to the turning mandrel, would create a pipe with generally longitudinal windings having a high beam strength; a short lead (i.e., a fine thread) would result in a pipe with high bursting strength. The cam configuration and rotational speeds are mandated by the specific pipe requirements.

The cam 110 is rotated through an adjustable transmission 111 from a driving chain 105 which permits the stroke speed of the wand 104 relative to the speed of mandrel to be adjusted for various types of pipe.

The continuous removal of pipe from the mandrel requires that the mandrel also reciprocate in exact timed relation with the applicator wand 104. An arcuate shifting fork 114 is positioned between the flanges 16 of a shift-collar member 118 fixed to the rear of the spindle 12 to effect this reciprocation. A finger 112 is at the lower end of the fork 114 which is operatively positioned in the trace of a second cam 115. This cam 115 is driven through a transmission 120 by the timing chain 105. The contour of the fork 115 permits the collar 118 to turn with the spindle, yet, under the direction of the cam 115, apply force to an appropriate flange 116 of the collar 118 thereby reciprocating the spindle.

The pipe wrapping process is begun by placing a thin cardboard tube or the like over the mandrel 14 and extending its forward end into the tractor pullers 28 and 30. Initially, the mandrel 14 and the applicator wand 104 are in their left-most positions. The end of a hot, tacky ribbon 11 of thermoplastic is placed directly into the in-running nip between the cardboard covered mandrel and the holding roller 100 nearest the headstock. The ribbon 11 may be either completely thermoplastic or may contain generally parallel reinforcing fibers which have been saturated with molten thermoplastic.

The first layer of pipe winding is placed on the cardboard covered mandrel as the application wand 104 is moved away from the headstock under the direction of its guiding barrel cam 110. The pitch of the winding is a function of the lead of the applicator wand 104 with respect to the rotational speed of the mandrel. The action of the holding roller 100 permits as large or as small a pitch as desired with minimal danger of the wound strands slipping. The second holding roller 102 is located at the other end of the transverse stroke of the applicator wand 104 to securely hold the winding in place as the direction of the applicator wand 104 is again quickly reversed by its barrel cam 110. The second layer may be reversed spiral with respect to the first and may either be at a different pitch or at the same pitch. These rolls 100 and 102 may be sprayed with a fog as a precaution against the strand sticking to them. Their use is particularly advantageous when the strand is composed of separate reinforcing filaments because the filaments are free to shift relative to one another as they are gripped by the rollers thereby preventing buckling of the strand at the "turn-around" node.

The movement of the mandrel under the control of its barrel cam 115 is synchronized with the reciprocating feed wand 104 and pull-off tractors 28 and 30 so that the mandrel advances by an amount preferably equal to the length of pipe pulled off by the tractors 28 and 30 for each complete cycle of the feed wand. The gradual advancement of the mandrel permits the just applied windings to be hardened by a chilling fluid running through internal cavities just below the surface of the mandrel, so that the mandrel may be slipped back to its starting position. The cooling fluid is supplied by a rotary fitting 122 which is carried on and reciprocates with the forward end of the spindle. The mandrel is quickly retracted by its cam at the end of its forward cooling stroke. Means for continuation of cooling the formed parts after removal from the mandrel are schematically indicated.

The initial windings of the pipe adhere to the cardboard tube starter permitting the tractors 28 and 30 to begin their continuous removal of pipe. Once the cardboard tube is gone the windings are applied directly to the polished and chilled mandrel. In addition, the newly formed pipe may pass through a chilling fog or bath 123 before being gripped by the tractors. The plastic covered cardboard starting tube may be discarded when the ends of the finished pipe are trimmed. The trimming and length cutter (not shown) may be located after the tractors.

The nodes formed when the holding rollers 100 and 102 retain the new winding as the direction of the feed wand 104 reverses must not be permitted to fall in the same circumferential position each time if it is desired to avoid a ridge in the pipe structure. The rotational speed of the mandrel, the movement of the mandrel and the wand stroke may be precisely adjusted to give a desired node pattern. The mandrel rotation and node precessing may be adjusted to give a straight single line, two or more lines, spiral lines, or a lost pattern with nodes not readily visible.

There are, of course, various modifications of this process which may be made within the scope of my invention. An additional roller 124 or sets of rollers located about the periphery of the mandrel, may be used to calender the newly formed pipe before it leaves the mandrel or to imprint, emboss or shape the pipe while yet soft with a trademark (or locally applied threads) for example.

Application of finishing, calendering, embossing and the like designs to the yet outer layer are considered part of my preferred process.

The rotary fitting 122 may be used to supply the mandrel with curing heat to permit the use of this system with thermosets. In this instance the bath 123 would be replaced by a curing oven and a release prewrap would be needed.

Figure 6:
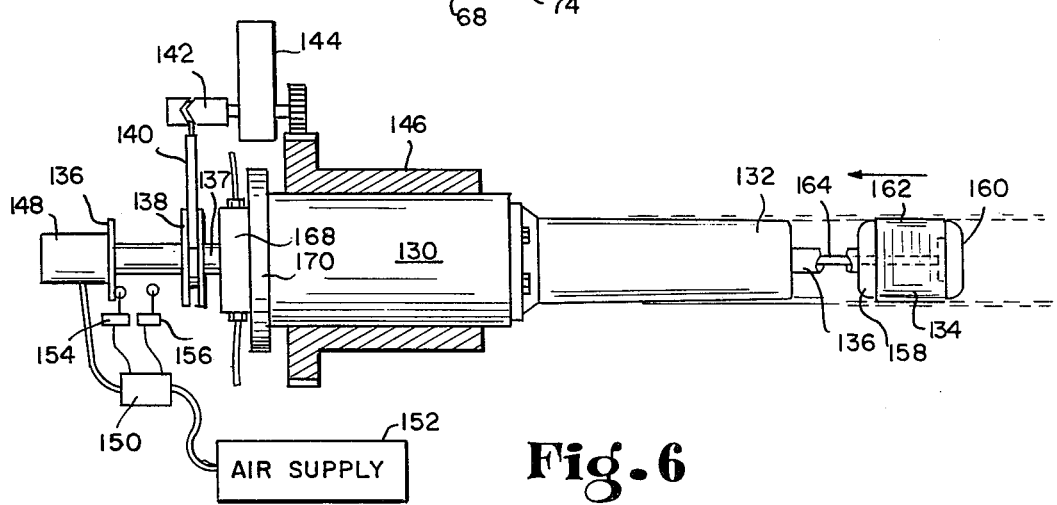
FIG. 6 is a plan view of a winding apparatus utilizing an internal gripper.

Another arrangement for forming plastic pipe in accordance with my invention is shown in FIG. 6. This structure comprises a tapered mandrel 132 which is connected to a rotating, nonreciprocatory spindle 130. The taper of the mandrel 132 is preferably about $\frac{1}{2}$° to 20° to facilitate pipe removal by an internal gripper 134. This gripper, or tractor member, is rotated by a tubular shaft 136 at the same speed at which the mandrel 132 rotates. The tubular shaft 136 extends through a longitudinal bore in the mandrel and spindle through a spacing collar 137 and is connected at its rear end to a flanged collar 138. A directional member 140 is arcuately forked at one end. This end fits in and about the collar 138. The other end of the forked member 140 forms a follower for a barrel cam 142. Rotary drive for the cam 142 is provided through an adjustable transmission 144 from a main spindle drive 146. The ends of the track in the cam 142 are flat to enable an air cylinder 148 supplied through a valve 150 from an air supply 152 to engage and disengage the gripper 134 when the gripper is not moving as determined by the positions of two switches 154 and 156.

More specifically, the gripper 134 is comprised of two compressing end members 158 and 160 which are connected at either end of a compressible rubber plug 162. A shaft 164 passes through the end member 158 closest to the mandrel, through the rubber plug 162 and is connected to the interior side of the other end member 160. The shaft 164 extends rearwardly through the hollow driving shaft 136 and terminates in a piston in the air cylinder 148. The air cylinder 148, when actuated, causes the shaft 164 to move longitudinally within, and with respect to, the encompassing shaft 136. The action compresses the rubber plug 162 causing its outer surface to radially expand and to come in contact with the inner surface of the newly formed pipe.

Thermoplastic strand is wound on the mandrel 132 using a cam guided wand apparatus generally the same as that shown in FIG. 1. A cardboard tube is placed initially around the mandrel and extends over the gripper 134. Tape is first wound on the tube covering the mandrel as the gripper 134 begins its reciprocating movement under the direction of the barrel cam 142. The inside of the mandrel 132 is provided with a plurality of chilling fluid channels to chill the surface of the mandrel in order to assure quick setting of the internal layers of the new pipe. The chilling liquid enters and leaves the spindle and mandrel through a rotary fitting 168 which rides on the tubular shaft 136 between the sheave member 138 and the rear spindle mounting block 170. The hardening thereby given to the interior surface of the pipe is sufficient to keep the compressed rubber plug 162 from deforming the pipe during conveyance. The cardboard tube has no further purpose after its rearwardly extending end is conveyed past the stroke of the gripper 134. It may be trimmed off and discarded after the desired length of pipe has been formed.

The intermittent operation of the system of FIG. 6 is preferably synchronized by appropriate relation of the cam 142 and gripping conveyor 134 movements to permit one stroke of the conveyor to expose an amount of bare mandrel equal to about one width of the strand being wound. This relationship gives a shingle or stepped relationship to the resultant layers of winding which effects high structural integrity in the wound article.

Apparatus and guides for handling and applying hot thermoplastic strands are shown in FIGS. 8 through 11. These structures are used to guide the hot sticky strand between a thermoplastic extruder and the winding mandrel and may be connected to auxiliary platforms adjustably positioned at appropriate places along the length of the guided strand. The device illustrated in FIG. 8 uses a wetted roller 196 which is rotated on an axis generally perpendicular to the path of the heated strand 198. This roller 196 is continually rotated and doctored to coat its surface with a film of water from a water bath 200. Steam is generated at the surface of contact between the top of the wetted roller 196 and the hot strand 198 which prevents the strand from sticking to the roller yet permits the roller to perform its function of guiding and supporting the strand. More specifically, the steam generated buoys up the strand and holds it off the surface of the roll.

Figure 9:
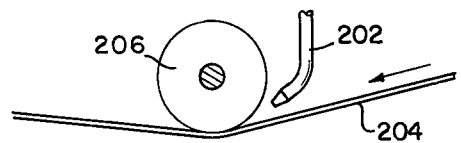
FIG. 9 is a vertical section of an alternative form of guiding device.

The structure illustrated in FIG. 9 utilizes a nozzle 202 to spray steam or other fog at the line of intersection between a hot strand of thermoplastic 204 and a rotating roller 206. Again, this strand is buoyed up and rides on a steam layer.

Figure 10:
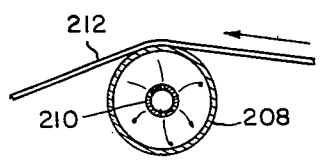
FIG. 10 is a vertical section showing a third guiding device.

A third structure is shown in FIG. 10 utilizing a sintered roll 208 which is supplied with steam or other cooling fog through a central journal 210. The steam escapes through the porous surface of the roll 208 and supports a hot strand 212 being guided by the roll 208 in a non-sticking relationship.

Figure 11:
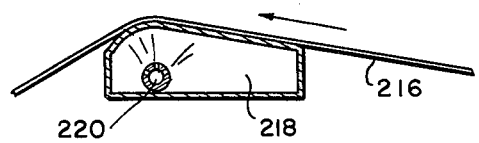
FIG. 11 is a section showing a fourth guiding device.

A similar structure is illustrated in FIG. 11 wherein a hot strand 216 passes over a non-rotating block 218 comprised of a sintered material. This block is supplied with a cooling fog, preferably steam, through an inlet 220. The configuration of the block 218 may be used to give more control and guidance to the strand for particular applications.

Figure 12:
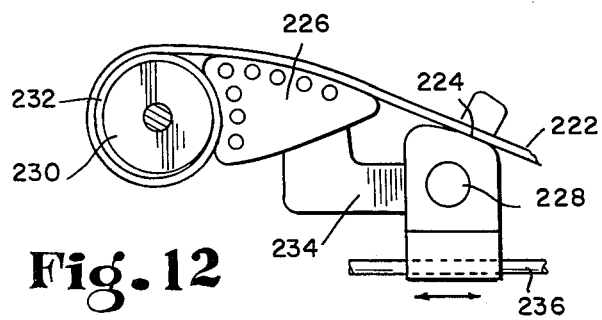
FIG. 12 is section showing a heated shoe applicator head.
Figure 13:
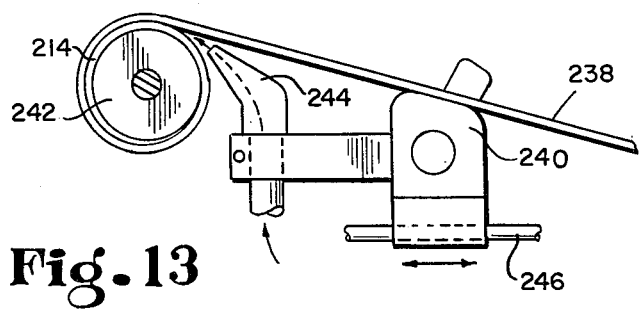

A relatively cold strand of thermoplastic may be used for winding but its surface must be heated to a sticky consistency before application to a mandrel or to windings already on a mandrel. Apparatus for this procedure are shown in FIGS. 12 and 13. FIG. 12 shows a strand 222 passing over a guide 224 and heated shoe 226. The heated shoe 226 is maintained at an elevated temperature by hot gas which is supplied through an inlet 228 generally parallel to the winding mandrel 230. The shape and heated surfaces of the shoe 226 enables both the surface of the in-running strand 222 and the surface of that portion of winding 232 already on the mandrel to be heated to a semi-molten consistench. In most instances, the tension on the in-running strand 222 is sufficient along with the applied heat to bond the progressive windings together. The carrier 234 for the heating element 226 may be retracted or pushed back on a slide 236 as wall thickness of the pipe being wound increases.

The structure of FIG. 13 also utilizes the concept of heating an in-running strand 238 at its point, or line, of intersection with already-laid-down windings. The relatively cool strand 238 passes over a guide 240 similar to that in FIG. 12, and is subsequently wound on a mandrel 242. A shaped nozzle 244 that is supplied with hot air or other gas and is directed at the place where the strand 238 touches the winding on the mandrel. Again the guide 240 carrying the nozzle 244 may be operatively moved away from the mandrel on a slide 246 as the pipe increases in wall thickness.

In winding stretch oriented preformed material on a cold mandrel, heating the side which will be applied to the mandrel is only necessary to give the inner surface of such formed tubular article a highly glossy finish. Surface reheat means indicated are only needed where windings are applied over other windings and where windings overlap adjacent layers.

Figure 14:
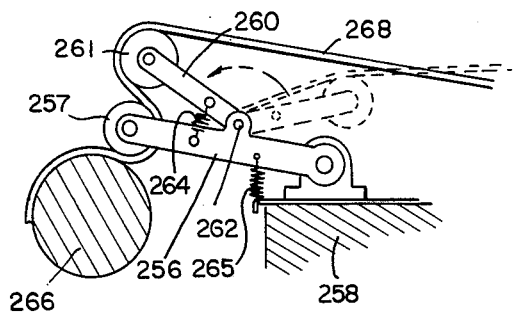
FIG. 14 illustrates a strand tensioning device.

Apparatus, such as that shown in FIG. 14, is necessary in winding pipe which requires a close maintenance of the tension in the incoming ribbon. The control of the tension becomes very important when the ribbon contains reinforcing strands of a material such as fiberglass. If the tension on the winding is too great the fiberglass reinforcing strands (if continuous) will cut through the soft thermoplastic and the inner surface of the wound pipe will be what is known as glass rich which thereby greatly reduces the inner chemical resistance of the pipe or tank. The apparatus in FIG. 14 comprises a lower arm 256 and roller 257 which is rotatably and spring connected to a platform 258. An upper arm 260 which supports a roller 261 at one end is rotatably attached at its other, or lower end to the lower arm 256 by a pin or similar coupling 262. The rolls may be fogged to prevent sticking of the guided strand. To begin winding, a spring 264 which is connected between the upper and lower arm is disconnected to permit the upper arm 260 to be swung back into the dotted line position. The winding on the mandrel 266 is started by passing the starting end of a hot strand 268 over the roller 261 on the end of the retracted arm 260 and into the in-running nip between the roller 257, on the forward end of the lower arm 256, and the mandrel 266. The mandrel 266 is slowly rotated. The upper arm 260 is concurrently returned to its solid line position and the spring 264 reattached. The rolls 257 and 261, which are driven at an adjustable speed with respect to the mandrel, are used to exert tension on the incoming strand 268 to enable the strand to be wound on the mandrel with a constant winding tension: i.e., they isolate the winding process from changes in the tension of the supplied strand. Furthermore, the rolls 257 and 261 compact the incoming strand between them to assure uniformity of the strand thickness prior to winding. Similarly, the lower roll may compact the strand onto the mandrel or a layer of winding on the mandrel.

The pressure applied by these rolls is determined by the selection of the tension springs 264 and 265. The latter spring operatively connects the lower arm 256 to the base 258 of the device. The rolls may be grooved to avoid calendering adjacent separate reinforcing filaments together when several such filaments are used. The entire tensioning device shown in FIG. 14 rides on a transverse slide (not shown) which may be driven by a ball nut and screw or other similar means.

Figure 15:
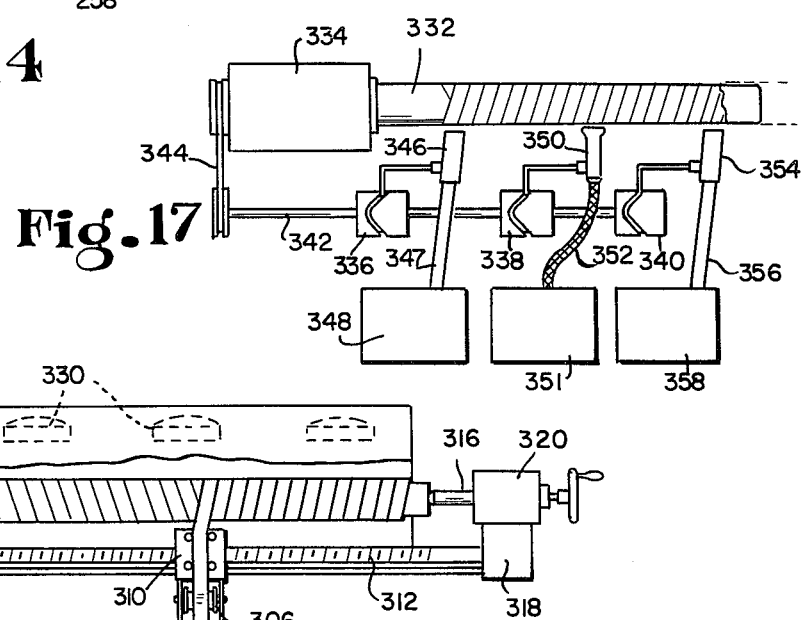
FIG. 15 is a plan view of a pipe winding apparatus.
Figure 16:
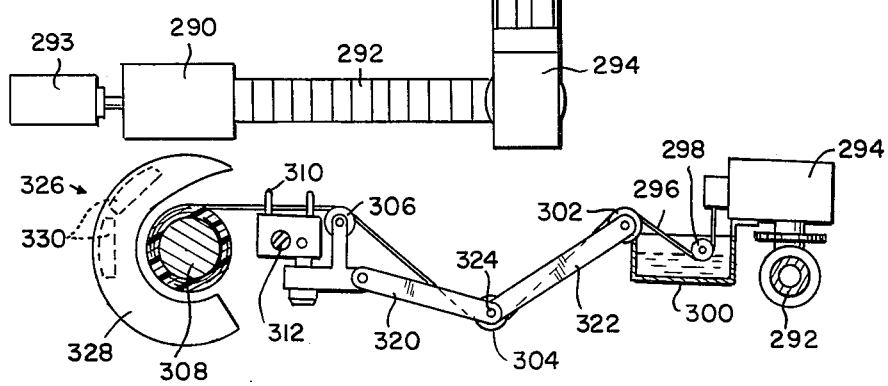
FIG. 16 is a section on the line 16—16 of FIG. 15.

An apparatus for winding comparatively short lengths of pipe in accordance with my invention is shown in FIG. 15 and FIG. 16. The apparatus shown comprises a melted thermoplastic supply hopper 290, an extruder 292, an extruder driving motor 293 and a swiveling die head 294. The die head alternatively may be equipped as a saturating cross head for treating or saturating reinforcing filaments or rovings which would be supplied from a creel (not shown). Thermoplastic forced into the die head 294 by the action of the screw in the extruder 292 merges from the head as a ribbon 296. The ribbon passes into a tank 300 of hot water and under a roller 298 which is immersed in the tank. The water case hardens the strand enabling it to pass over subsequent guiding rolls 302, 304 and 306 without sticking. The still hot interior of the strand reheats the surface layers before the strand is wound on a rotating mandrel 308. The strand is guided onto the mandrel 308 by a traversing guide 310 which is driven back and forth on a lead screw 312. The rotary drive for the mandrel 308 and the lead screw 312 is contained in a headstock 314. The other end of the mandrel 308 is rotatably held in place by an adjustable center 316.

The other end of the lead screw 312 is supported and contained in a control box 318 which supports the adjustable center 320. This box 318 contains a revolution counter for the lead screw for adjustably effecting a reversal of the direction of rotation of the screw. The point of this reversal depends on the length of pipe being wound.

The length of the guiding mechanism for the hot strand between the die head 294 and the traversing guide 310 must be compensated as the mechanism swings through its winding application arc. Supporting side members 320 and 322 are rotatably connected to the traversing guide 310, to the front of the extruder supported water tank 300 and to each other. The common connection is by and on the shaft 324 which carries the middle roller 304. This roller 304 is moved up and down by the members 320 and 322 as the guide 310 is traversed back and forth in order to compensate for the change in length required in the mechanism arm.

Figure 7:
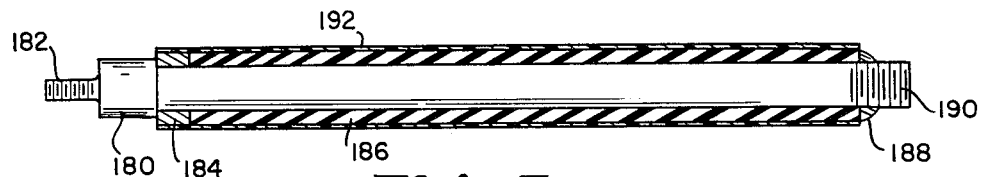
FIG. 7 is a fragmental section showing a collapsible mandrel.
Figure 8:
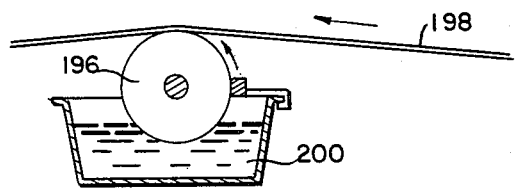
FIG. 8 is a vertical section of a hot strand guiding device.

FIG. 7 illustrates an easily removable, semi-collapsible mandrel for use in making short lengths of pipe where apparatus for conveying the pipe off is not practical. The mandrel comprises a body portion 180 which is threaded at one end 182 for mounting in a driving spindle. A cylindrical collar 184 is fastened around the body of the mandrel 180 near one end. A low durometer rubber sleeve 186 is slipped on the mandrel and into abutting relationship with the collar 184. A second collar 188 is mounted as by threads 190 on the opposite end of the mandrel into abutting relation with the other end of the rubber sleeve 186. A thin jacket 192 preferably made from a material such as Teflon or silicone rubber, is fastened to the exterior surface of the rubber sleeve 186. The thread-on collar 188 is tightened in order to compress the rubber sleeve 186 and force the jacket 192 uniformly and radially outward. This expansion of the jacket 192 can be effected prior to or after connecting the mandrel 180 to a spindle. After thermoplastic pipe of the desired thickness and length has been wound on the mandrel, the mandrel may be removed from the spindle and another like mandrel installed. To remove the pipe, the compressing collar 188 is loosened thereby permitting the rubber sleeve 186 to return to its original shape which in turn permits the mandrel to be easily extracted.

Collapsing and expanding of such a special release mandrel can also be mechanically synchronized with the already described collapsing and expanding incremental intermittent pushoff device 134 already described and shown in FIG. 6.

An oven structure 326 is optional and when used may partially surround the mandrel 308 as shown in FIG. 15 and FIG. 16. It is comprised of an outer hood 328 and an array of low intensity flame burners or hot gas inlets 330. The oven maintains the surfaces of the partially complete pipe in a semi-molten stage to assure the bonding of subsequent layers.

Using the mandrel illustrated in FIG. 7 with the process diagrammed in FIGS. 15 and 16 and the guiding and tension controls previously described, parts such as posts, poles and other assorted tubular shapes can be made. When the traverse lead is reversed at the same node each pass of a full length oven enclosed wind and when the lead is substantially greater than the width of the strand being applied, an open meshed product of great strength-to-weight ratio is obtained.

In a similar process use of an oven may be avoided by progressively winding a mandrel with an open meshed pattern where the applied wrap encases the prior layer before cooling and shrinking can distort or weaken the part.

Figure 17:
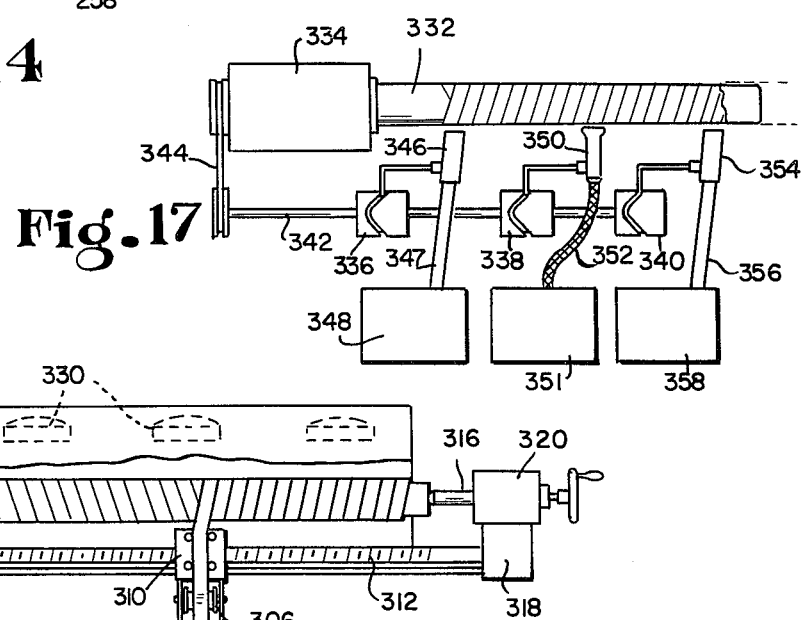
FIG. 17 is a representation, partially diagrammatic, of a system for producing composite pipe.

A structure for forming a heterogeneous pipe is shown in FIG. 17. It is generally comprised of a mandrel 332 mounted on and driven through a transmission in a headstock 334.

A serial array of barrel cams 336, 338 and 340 are mounted on a shaft 342 which is driven by a timing chain 344 from the main mandrel drive in the headstock 334. The barrel cam 336 nearest the headstock controls the stroke of a hot thermoplastic strand applicator 346. The thermoplastic strand 347 is supplied directly from an extruder 348 for winding a first layer on the mandrel. Preferably, this first or inner layer is comprised of a highly chemical resistant thermoplastic such as polystyrene, or polyvinyl-chloride.

The second layer is comprised optionally for example either of a thermoplastic or a thermosetting plastic. In this instance, a troweling head 350 is guided by a barrel cam 338 for reciprocatory motion. A second extruder 351 supplies, in the case of thermoplastic, molten material through a flexible supply tube 352 which is encased in a low voltage braided resistance heater. The supply tube terminates in a troweling head 350 which extrudes and trowels a layer of hot plastic onto the first previously wound layer. Alternately, the second layer may be comprised of a thermosetting plastic such as a polyester, a polyvinyl-chloride plastisol containing a blowing agent or any other heat activated plastic material which can also be troweled on.

A third layer is applied by winding a hot thermoplastic strand by a third applicator wand 354 supplied with a strand 356 from an extruder 358. The third layer is generally comprised of a strong, scuff resistant substance such as a weatherproof grade of acrylic or an impact grade of polystyrene.

There are several permutations of this process which fall within the scope of my invention. If the middle layer were a thermosetting plastic the hot third layer and the still semi-hot first layer would cause the setting of the sandwiched layer. This process enables pipe with a thermosetting layer to be manufactured without the need for reinforcing glass filaments which has heretofore characterized thermosetting plastic pipe. If the middle layer were made of PVC (polyvinyl-chloride) with a blowing or foaming agent, the hot third layer will seal the middle layer and cause the blowing agent to react. The resulting pipe would not only be chemical resistant on the inside and scuff resistant on the outside but would be insulated by the foamed middle layer. The middle layer could also be comprised of a filamentary winding which under winding tension imbeds itself in the first layer of thermoplastic.

In any of the various filament or strand winding devices above described, the characteristics of the pipe formed will depend upon the type of plastic employed and upon the use to which the pipe is going to be put. A pipe with high beam strength requires relatively high lead winding helices, while high bursting strength requires very low lead helices. Combinations of patterns applied at successive stations give control of resultant properties.

The tight winding of hot strands inherently adds strength to the finished product by stretch orienting the molecular structure in the strand. The type of conveyance, i.e., internal or external grippers, depends upon the length of pipe which is desired. External grippers with their continuity of conveyance are much more adapted to use with long lengths of rigid pipe than are the intermittent working internal grippers which can work best in small diameter more flexible tubing.

While the winding machines illustrated are described as used in the production of pipe having a circular cross-section and therefore employ mandrels of circular cross-section, mandrels of other cross-sectional shapes may be employed to produce pipes of other than circular cross-section.

Although one of the major embodiments of this process is elimination of the need for prewrapping of a complex self-conveying mandrel as is used with reinforced polyesters on occasion, e.g., as where a very low tensile first layer material is used, a prewrapping and/or application of mold release material to the subject tapered mandrel may be used.

The great variability of the claimed process may be further illustrated by using a more steeply tapering chilled mandrel, for example, a mandrel tapering from 12 inches to 6 inches over a length of 8⅓ ft., and by controlling the lateral traverse movement of the base of the reciprocatable applicator station and further synchronizing the movement of the first hauloff tractor with the said base traverse (e.g. by mounting the tractor traverse controlling limit switches on a movable bar attachable to said base), the winding can be caused to take place at any part of the tapered mandrel and products may thereby be made having any inside diameter corresponding to that part of the bar where such winding is applied. In this specific instance the inside diameter of each stepwise incremental axial movement would have a taper of 0.030 inch per axial inch. Fairly rapid transitions in diameter give sculptured or turned columnar effects while a constant movement can produce uniformly tapered products such as light poles. The inside diameters will always have incremental tapers equal to the mandrel's taper.

Considerable variation is permissible in the relation between the width of the ribbon and the lead of its turns as wound. Successive turns may overlap to any desired extent by making the lead less than the width of the strand. If desired, the lead may be so selected that adjacent turns abut without any overlapping. If the lead is lengthened to a point where adjacent turns are axially spaced, an open-wound layer will be formed, and by superimposing a plurality of such layers it is possible to produce a hollow structure which, while not suitable for the conveyance of liquids, will serve, for example, as a flag pole.

I claim:

1. A continuous method for forming continuous tubular articles from one or more continuous semi-molten plastic strands, which comprises the steps of conveying and applying said strands at one or more application stations, to a rotating and reciprocating winding mandrel, pressing said strands into combining contact with prior applied material and mandrel, wrapping said strands in preselected pattern using guiding means having a reciprocatory motion, and removing the wound multi-layered product in an intermittent manner which latter motion is coordinated with the mandrel and the applicator's axial reciprocatory motions to provide at least a momentary relationship between the applied plastic and the moving mandrel to enable the inner portion of the plastic to harden so that it may be removed by intermittently slipping on the mandrel, while continuously forming the article.

2. A method as set forth in claim 1 for forming heterogeneous pipe which comprises includes the steps of helically winding a first hot thermoplastic strand on a mandrel to form a first layer on the mandrel, applying a second strand of uncured thermosetting material on said first layer to form a second layer on the mandrel, and helically winding another hot thermoplastic strand on said second layer to form a third layer on the mandrel and to seal and cure said second layer of thermosetting material.

3. A method as set forth in claim 1 of forming a composite plastic article including the steps of winding a ribbon-like semi-molten thermoplastic strand on a cold reciprocating and rotating mandrel using a reciprocatory motion to form a first layer thereon, winding a strand of fibrous reinforced thermosetting plastic on said first layer to form a second layer, and winding a strand of hot thermoplastic material on said second layer to form a third layer on said mandrel and to seal and cure said second layer.

4. A method as set forth in claim 1 for forming continuous cylindrical articles from a thermoplastic material, which includes the steps of guiding a ribbon-like strand of the material to a cold reciprocating and rotating mandrel, heating the strand in close proximity to and at its line of intersection with the mandrel to at least the temperature at which the surface of said material becomes semi-molten, helically cross winding a first layer of the thereby heated strand on said mandrel, heating a second ribbon-like strand and the outer surface of said first formed layer in close proximity to their lines of intersection and winding a second layer of said heated strand on said heated first layer.

5. An apparatus for winding cylindrical plastic articles from a strand of a thermoplastic material heated to a semi-molten condition which comprises a mandrel supported at one end and free at the other end, means for continuously rotatably driving said mandrel, an applicator for supplying the heated strand adjacent said mandrel, means for guiding said heated strand over said applicator, means for reciprocating said applicator longitudinally of said mandrel to lay a progressively cross helically wound layer of the thermoplastic strand on said rotating mandrel, means operatively coupled to said mandrel for cooling the surface of the mandrel and thereby also cooling the inner surface of said progressively wound layer to make said inner surface rigid, means to grip said wound layer internally beyond the free end of said mandrel; and means to move said gripping means axially away from the free end of said mandrel to intermittently convey the wound layer from said mandrel, while the article is continuously being formed.

6. The winding apparatus of claim 5 which includes actuating means connected to said gripping means and operable for intermittently and adjustably moving said gripping means in the axial direction of said mandrel.

7. An apparatus for winding thermoplastic articles from a ribbon-like strand of a thermoplastic material heated to a semi-molten condition which comprises a mandrel having at least one free end, means for rotatably driving said mandrel, means for reciprocating said mandrel axially through an adjustable stroke, an apparatus adjacent said mandrel for supplying the heated strand to said mandrel, means to reciprocate said applicator in the axial direction of said mandrel in timed relationship with the axial movement of said mandrel to progressively apply one or more layers of cross helically wound strands to said mandrel, means operatively coupled to said mandrel for chilling the mandrel thereby to harden at least the inner surface of said layer of wound strands, rotary means to externally grip said hardened layer and means to reciprocate said gripping means for conveying said layer in the axial direction from the free end of said mandrel, while the layer is continuously being formed and wherein said means to reciprocate the mandrel, said means to reciprocate the applicator, and said means for conveying said layer are synchronized to provide a momentary stationary relationship between the mandrel and the applied strand to allow hardening thereof.

8. An apparatus for winding thermoplastic articles as claimed in claim 4 including a plurality of holding rollers axially spaced along said mandrel from each other and engaging the winding on the mandrel for maintaining the position of a winding on said mandrel when the direction of said reciprocatory applicator is reversed.

9. An apparatus for winding thermoplastic articles from a semi-molten thermoplastic strand as claimed in claim 7 wherein said gripping means comprises a plurality of axially spaced external grippers and said means to reciprocate said gripping means is operative to reciprocate said grippers in timed alternating relationship for continuously conveying said hardened layer from said apparatus.

10. Apparatus for winding thermoplastic articles from a semi-molten strand as claimed in claim 7 including a device for releasably guiding a ribbon-like strand of thermoplastic material which is at a temperature such that the strand is at least semi-molten, which comprises a roller, means for maintaining a supplying of fluid on at least the surface of said roller where the roller surface and the strand converge, said fluid being operative at the interface of the strand and said roller surface for supporting the strand on said roller surface while preventing the strand from adhering to the roller surface.

11. Apparatus for winding thermoplastic articles from a semi-molten strand as claimed in claim 7 including a device for releasably guiding a ribbon-like thermoplastic strand heated to the point of being at least semi-molten which comprises a tank member for containing a fluid having an inlet for allowing the strand to enter said tank and be immersed in said fluid, and an outlet, and a roller positioned adjacent said outlet over which the strand passes as it leaves said tank, the liquid in said tank being operative for temporarily hardening the skin of the strand and thereby prevent sticking of the strand to the roller.

12. Apparatus for winding thermoplastic articles from a semi-molten strand as claimed in claim 7 including a tensioning device for applying a semi-molten thermoplastic ribbon-like strand to a rotating cold mandrel which comprises a base adjacent the mandrel, a first arm in a plane perpendicular to the axis of the mandrel, having a roller at the end adjacent the mandrel and being rotatably connected at the other end to said base, a second arm member having a roller at one end and being rotatably connected to said first arm, first and second tension members, said first tension member being connected between said first arm and said base for operatively holding the roller on said first arm against the mandrel, said second tension member being connected between said first and second arms for operatively holding the rollers on said arms in proximity to one another, the strand being operatively passed over said roller on the second arm into the intersection between the two rollers, around the roller on the first arm and between said roller on the first arm and the mandrel.

* * * * *

UNITED STATES PATENT AND TRADEMARK OFFICE
CERTIFICATE OF CORRECTION

PATENT NO. : 4,078,957
DATED : March 14, 1978
INVENTOR(S) : Rexford H. Bradt

It is certified that error appears in the above-identified patent and that said Letters Patent are hereby corrected as shown below:

Col. 2, line 13, "not" should be -- no --.

Col. 2, line 14, "from mounting" should be -- form mounted --

Col. 2, line 28, "means" should be -- mean --.

Col. 2, line 35, "of", first occurrence, should be -- or --.

Col. 3, line 18, "the" omitted between "and/or" and "pre-wrapped".

Col. 5, line 5, "thermsetting" should be -- thermosetting --.

Col. 5, line 34, "a" omitted between "is" and "section"

Col. 5, line 36, "Fig. 3" should be -- Fig. 13 --.

Col. 6, line 51, "back" omitted between "tractor" and "toward"

Col. 6, line 66, "two" omitted between "by" and "holding"

Col. 7, line 26, "16" should be -- 116 --.

Col. 8, line 49, "hot" omitted between "yet" and "outer"

Col. 8, lines 60 and 61, "1/2° to 20°" should be -- 1/2° to 2°.

UNITED STATES PATENT OFFICE
CERTIFICATE OF CORRECTION

Patent No. 4,078,957   Dated March 14, 1978

Inventor(s) Rexford H. Bradt

It is certified that error appears in the above-identified patent and that said Letters Patent are hereby corrected as shown below:

Column 14, line 62 (Claim 2) "comprises" should deleted

Column 16, line 8 (Claim 8) "claim 4" should be -- claim 7 --.

Signed and Sealed this

Twenty-second Day of August 1978

[SEAL]

Attest:

RUTH C. MASON
Attesting Officer

DONALD W. BANNER
Commissioner of Patents and Trademarks